United States Patent [19]

Doany et al.

[11] Patent Number: 5,597,222
[45] Date of Patent: Jan. 28, 1997

[54] OPTICAL RELAY LENS SYSTEM FOR PROJECTION DISPLAYS

[75] Inventors: Fuad E. Doany, Katonah, N.Y.; Rama N. Singh, Bethel, Conn.

[73] Assignee: IBM Corporation, Armonk, N.Y.

[21] Appl. No.: 373,696

[22] Filed: Jan. 17, 1995

[51] Int. Cl.⁶ .................................................. G03B 21/14
[52] U.S. Cl. ...................... 353/33; 353/31; 349/5
[58] Field of Search .................... 353/31, 33, 100, 353/102; 359/40, 49

[56] References Cited

U.S. PATENT DOCUMENTS

| | | | |
|---|---|---|---|
| 4,070,098 | 1/1978 | Buchroeder . | |
| 4,427,977 | 1/1984 | Carollo et al. | 353/33 |
| 4,726,665 | 2/1988 | Itoh . | |
| 4,836,649 | 6/1989 | Ledebuhr et al. | 353/31 |
| 4,850,685 | 7/1989 | Kamakura et al. | 353/31 |
| 4,981,352 | 1/1991 | Tejima et al. | 353/31 |
| 5,098,184 | 3/1992 | van den Brandt et al. | 353/38 |
| 5,153,752 | 10/1992 | Kurematsu et al. | 353/31 |
| 5,218,481 | 6/1993 | McBeath et al. | 359/802 |
| 5,239,322 | 8/1993 | Takanashi et al. | 353/31 |
| 5,270,804 | 12/1993 | Lach | 353/33 |
| 5,442,413 | 8/1995 | Tejima et al. | 353/69 |

FOREIGN PATENT DOCUMENTS

| | | | |
|---|---|---|---|
| 0228620 | 9/1990 | Japan | 353/101 |

*Primary Examiner*—William Dowling
*Attorney, Agent, or Firm*—Scully, Scott, Murphy and Presser

[57] ABSTRACT

A projection display which includes reflective light valves such as liquid crystal spatial light modulators, and a 1× optical relay lens system. The 1× optical relay lens system eliminates the requirement for a projection lens having a large retrofocus distance. Projection displays based upon reflective liquid crystal light valves (spatial light modulators) require dichroic beam splitters necessary for color separation and a polarizing beam splitter necessary for light valve operation positioned between the light valves and the projection lens. The 1× optical relay lens produces a relayed intermediate image of the light valves, and incorporates therein the dichroic beam splitters and the polarizing beam splitter. The 1× optical relay lens produces an intermediate image which is projected by the projection lens at a given magnification with minimal working distance, which results in relatively less residual lateral color and an inexpensive projection lens.

5 Claims, 1 Drawing Sheet

OPTICAL RELAY LENS SYSTEM FOR PROJECTION DISPLAYS

BACKGROUND OF THE INVENTION

1. Field of the Invention

The present invention relates generally to an optical relay lens system for a projection type of display. More particularly, the subject invention pertains to a 1× optical relay lens system which incorporates therein dichroic beam splitters and a polarizing beam splitter for use with a projection display which uses reflective light valves such as liquid crystal spatial light modulators.

The 1× optical relay lens system of the present invention eliminates the requirement for a projection lens having a large retrofocus distance in projection displays based upon reflective liquid crystal light valves. The requirement for a projection lens having a large retrofocus distance is a particular problem in desk top displays which are relatively compact and require a short screen-to-lens distance.

DISCUSSION OF THE PRIOR ART

Projection displays based upon reflective liquid crystal light valves (spatial light modulators) require several optical components positioned between the light valves and the projection lens. In particular, dichroic beam splitters necessary for color separation and a polarizing beam splitter necessary for light valve operation are typically large optical components which are positioned between the light valves and the projection lens. Projection systems using this prior art configuration require telecentric retrofocus lenses with a working distance much larger than the focal length thereof. Retrofocus lenses in the photographic industry have a maximum working distance of 1.9×focal length, and even that working distance is available only for short focal length lenses.

In projection displays such as optical monitors, an image from an active device, such as a spatial light modulator, is projected onto a screen at a desired magnification. As the size of the active device is decreased, a reflecting spatial light modulator (SLM) is required to obtain good contrast from the system. For color images, images in three primary colors obtained from three spatial light modulators are simultaneously projected and superposed onto the screen. The optics used to generate color images in this manner typically consist of a color separation/combining prism set and a polarizing beam splitting cube.

The color separation/combining prism set and the polarizing beam splitting cube are positioned between the projection lens and the spatial light modulators, and the optical path through this assembly winds up being at least 150 mm for a 35 mm×35 mm spatial light modulator, and may be as large as 200 mm depending upon the geometry of the optics.

In addition, the spatial light modulators work at best efficiencies with light being incident thereon at substantially normal incidence over a finite conical angle. The polarizing beam splitting cube must operate over the full visible spectrum and over this finite conical angle. This also constrains the projection lens to operate with light reflecting from the spatial light modulators in essentially a normal incidence mode, which amounts to having a projection lens which is designed for a telecentric mode on the SLM side and for a rather large working distance in glass.

Such projection lenses are quite expensive, and may not be very practical because the required asymmetry results in a significantly higher amount of residual lateral color, resulting in a lack of convergence of the three primary color images, which varies linearly with position in the field. Essentially, the three different wavelengths of the three primary colors have slightly different magnifications resulting in chromatic aberration and an imperfect overlap at the edges of the images.

In addition, with a normal projection lens, with the color combining/separating prism set and the polarizing beam splitter being positioned between the spatial light modulator and the projection lens, an inordinately large number of interface surfaces are introduced, which makes ghost images and veiling glare very difficult problems to solve by baffling.

The large number of interface surfaces between the projection lens and the spatial light modulator produce multiple reflections (ghost images) and scattered light.

SUMMARY OF THE INVENTION

The aforementioned problem with projection displays using reflective light valves can be solved by using a 1× optical relay lens to produce a relayed intermediate image of the three light valves. This relayed image can then be utilized with a variety of projection optical systems from short-throw desk top displays to long-throw room projectors while using a simplified projection lens without a large retrofocus distance.

A self-contained module having a 1× optical relay lens can be a central component in a wide variety of projection displays. An entire line of displays can be designed using the one module, with the only substantial difference being the projection lens that projects the relayed intermediate image provided by this module onto the screen.

Accordingly, it is a primary object of the present invention to provide a 1× optical relay lens system for projection displays.

A further object of the subject invention is the provision of a 1× optical relay lens system which incorporates therein dichroic beam splitters and a polarizing beam splitter, for use with a projection display system having reflective light valves, such as liquid crystal spatial light modulators. Preferably, the glass for the color combining/separation prism set and the glass for the polarizing beam splitting cube are equally split and located on the object and image sides of the 1× relay lens to enable a large working distance in glass to be available without resulting in residual lateral color. Moreover, aberrational problems become less deleterious with the 1× relay lens approach when the total working distance is equally split on the object and image sides of the relay lens.

The intermediate image can be projected by a projection lens at a given magnification with minimal working distance, which results in relatively less residual lateral color and an inexpensive projection lens.

The availability of an intermediate image also provides a suitable location at which to introduce baffles for improving the contrast in the final image.

Also, the use of the 1× relay lens also means that the polarizing beam splitter need not be restricted to a cubic configuration. A cube with a 45° reflecting interface is typically desirable since it will be smaller than a beam splitter which has the reflecting interface at a larger angle. Moreover, cheaper substrate materials, such as the common glass BK7, could be used in the design of the polarizing beam splitter if the incidence angle is changed from 45 degrees to 57 degrees.

In accordance with the teachings herein, the present invention provides apparatus for projecting onto a screen a first image at a first wavelength, a second image at a second wavelength, and a third image at a third wavelength. The arrangement combines the first, second and third images to form a substantially superposed relayed image, and an image of the substantially superposed relayed image is then projected onto a screen.

In greater detail, the substantially superposed relayed image is a real image which is produced by the 1× relay lens, which also incorporates therein a color splitting prism assembly and a polarizing prism assembly. Preferably, the glass for the color splitting separation/combining prism assembly and the glass for the polarizing prism assembly are equally split and located on the object and image sides of the 1× relay lens to provide a large working distance in glass without resulting in residual lateral color. The color splitting prism assembly preferably comprises a crossed dichroic beam splitter cube, and the polarizing prism assembly preferably comprises a polarizing beam splitter cube. Advantageously, the sizes of the beam splitter cube and the polarizing beam splitter cube are substantially equal, resulting in a 1× symmetrical lens, such that the assembly is free from coma, distortion and lateral color, and is corrected for any remaining aberrations.

BRIEF DESCRIPTION OF THE DRAWINGS

The foregoing objects and advantages of the present invention for a 1× optical relay lens system for a projection display may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

Figure 1:
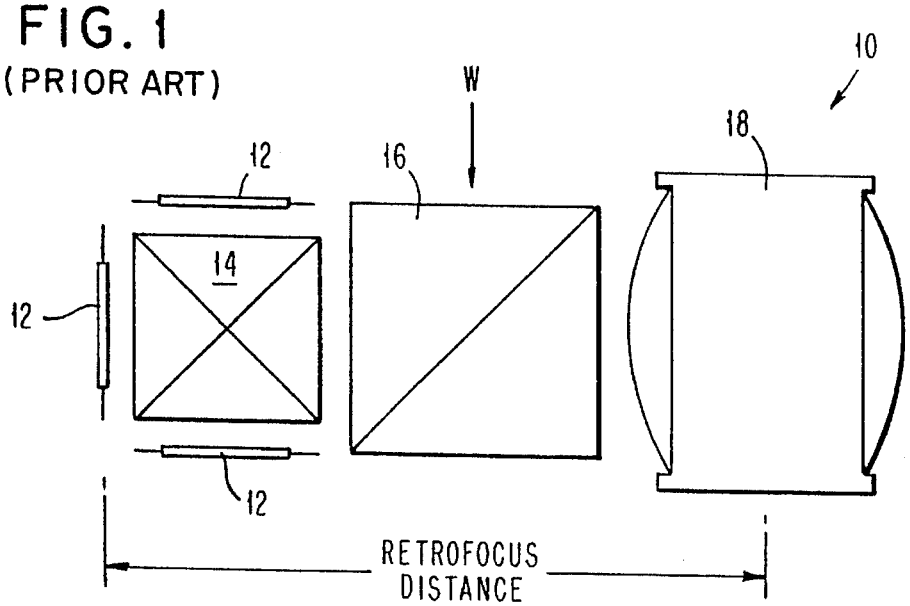
FIG. 1 illustrates a somewhat simplified typical prior art configuration for a three-light valve projection display.

Referring to the drawings in detail, FIG. 1 illustrates a somewhat simplified typical prior art embodiment of a three-light valve projection display system 10. The projection display system 10 includes three liquid crystal reflective light valves (spatial light modulators) 12 positioned on three surfaces of a crossed dichroic beam splitter cube 14, a polarizing beam splitter cube 16, and a projection lens 18. White light illumination W is introduced into one face of the polarizing beam splitter cube 16 which passes (reflects) one polarized component thereof into the crossed dichroic beam splitter cube 14. The dichroic beam splitter cube 14 then separates the polarized white light into red, green and blue components.

Each color component is incident upon a liquid crystal reflective light valve 12 which rotates the polarization of the light to produce the required image, in a manner as is known in the art. The three reflected perpendicularly polarized images are then recombined in the dichroic beam splitter cube 14 and pass back through the polarizing beam splitter cube 16 to the projection lens 18.

As illustrated at the bottom of FIG. 1, with this prior art approach the projection lens 18 requires a very large working distance (retrofocus distance). Replacing the dichroic beam splitter cube 14 with individual plate beam splitters only increases this long retrofocus distance. This required working distance makes it particularly difficult to design projection lenses with short lens-to-screen distances, such as those required for desk top projection displays.

In the operation of a typical prior art reflective liquid crystal light valve as illustrated in FIG. 1, p illumination is passed (reflected) by the polarizing beam splitter cube 16 through the dichroic beam splitting cube 14 to illuminate the reflective liquid crystal light valves 12. Each pixel of each light valve is selectively driven by a voltage to selectively rotate the polarization of the reflected radiation, such that the p polarization is selectively reflected by the light valve as s polarization back through the polarizing beam splitter cube to the projecting optics. Light in these images returns to the beam splitter as p polarization from bright pixels and as s polarization from dark pixels.

Figure 2:
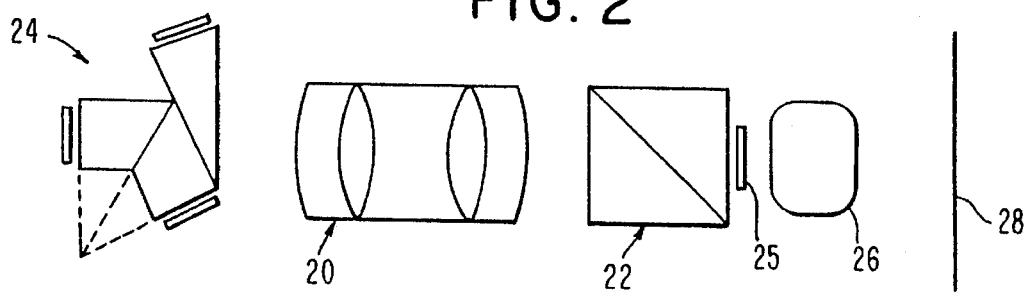
FIG. 2 illustrates the general principle of operation of the present invention, wherein a 1× relay lens is combined with a polarizing assembly and a chromatic beam splitting assembly to produce a relayed intermediate image which is then projected onto a display by a projector lens.

FIG. 2 illustrates the general principle of operation of the present invention, wherein a 1× relay lens 20 is combined with a polarizing assembly 22 and a chromatic beam splitting assembly 24 to produce a relayed intermediate image at 25 which is then projected by a projector lens 26 onto a display 28. The dichroic beam splitter cube 24 is illustrated with a slightly different configuration than that shown in FIG. 1, and can be any appropriate design, such as disclosed in U.S. Pat. No. 3,202,039.

Figure 3:
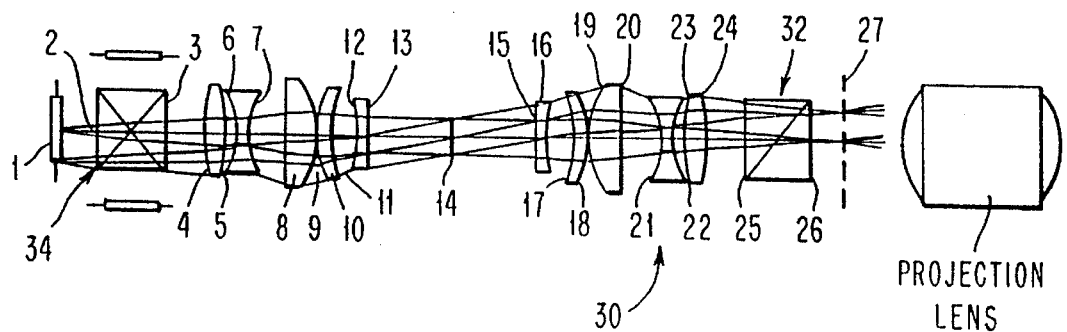
FIG. 3 illustrates an exemplary embodiment of a specific design for a 1× relay lens system which incorporates therein polarizing and dichroic cubes.

FIG. 3 illustrates an exemplary embodiment of a specific design for a 1× relay lens system 30. The design of the 1× relay lens system incorporates therein a polarizing beam splitter cube 32 and a dichroic beam splitter cube 34. The size of the two cubes 14, 16 are preferably chosen to be identical, resulting in a 1× symmetrical lens, symmetrical about center line CL. Such lenses are, in theory, free from coma, distortion, and lateral color, and can be corrected for any remaining aberrations.

The present invention provides a self-contained 1× optical module that produces a relayed intermediate image in the projection path. The relayed intermediate image can then be optically projected by a variety of projection lenses to produce desk top display systems as well as long throw projection systems. The 1× optical module enables switching from desk top to long throw projectors with a simple lens change without affecting the critically aligned 1× optical module system. Another advantage of the availability of an intermediate image plane is that it provides a suitable location for spatial filters for better stray light filtering and improved contrast.

It should be emphasized that many different designs are available for a 1× relay lens within the constraints mentioned hereinabove. A self-contained 1× optical module consisting of the dichroic beam splitters, the relay lens system, and the polarizing beam splitter cube has been designed, and one example of a detailed 1× relay lens design is shown in FIG. 3 and in the following Table 1. In Table 1, a positive radius on a surface implies a surface that is convex to incident light from the object, and the thicknesses are measured along the optical axis. This module encapsulates two 55 mm cubes and has a field of 50 mm.

TABLE 1

FILE: DOANY NPRINT D1 VM/XA Conversational Monitor System

| SURFACE | RADIUS mm | THICKNESS mm | GLASS NAME | REFRACTIVE INDEX | ABBE VALUE | SEMI-APERTURE mm |
|---|---|---|---|---|---|---|
| 1 | SPATIAL LIGHT MODULATOR | | | | | |
| 1 | .0000 | 30.0000 | AIR | | | 25.0 |
| 2 | .0000 | 55.0000 | BK7 | 1.517 | 64.2 | 28.1 |
| 3 | .0000 | 32.2803 | AIR | | | 31.9 |
| 4 | 119.0363 | 20.0000 | LAK8 | 1.713 | 53.8 | 35.8 |
| 5 | −86.9036 | 7.1797 | AIR | | | 35.3 |
| 6 | −58.2382 | 10.0000 | SF2 | 1.648 | 33.8 | 32.6 |
| 7 | 89.4180 | 33.1400 | AIR | | | 33.2 |
| 8 | −663.4999 | 23.5000 | LAK8 | 1.713 | 53.8 | 41.5 |
| 9 | −66.8152 | 1.0000 | AIR | | | 43.3 |
| 10 | 85.3654 | 15.0000 | LAK8 | 1.713 | 53.8 | 36.9 |
| 11 | 162.9981 | 19.4000 | AIR | | | 33.4 |
| 12 | −106.1404 | 7.0000 | SF8 | 1.689 | 31.2 | 27.9 |
| 13 | 848.8993 | 70.0000 | AIR | | | 26.6 |
| 14 | APERTURE STOP | | | | | |
| 14 | .0000 | 70.0000 | AIR | | | 13.9 |
| 15 | −848.8993 | 7.0000 | SF8 | 1.689 | 31.2 | 26.5 |
| 16 | 106.1404 | 19.4000 | AIR | | | 27.8 |
| 17 | −162.9981 | 15.0000 | LAK8 | 1.713 | 53.8 | 33.3 |
| 18 | −85.3654 | 1.0000 | AIR | | | 36.8 |
| 19 | 66.8152 | 23.5000 | LAK8 | 1.713 | 53.8 | 43.2 |
| 20 | 663.4999 | 33.1400 | AIR | | | 41.3 |
| 21 | −89.4180 | 10.0000 | SF2 | 1.648 | 33.8 | 33.1 |
| 22 | 58.2382 | 7.1797 | AIR | | | 32.6 |
| 23 | 86.9036 | 20.0000 | LAK8 | 1.713 | 53.8 | 35.2 |
| 24 | −119.0363 | 32.2803 | AIR | | | 35.7 |
| 25 | .0000 | 55.0000 | BK7 | 1.517 | 64.2 | 31.9 |
| 26 | .0000 | 30.0000 | AIR | | | 28.1 |
| 27 | IMAGE | | | | | |
| 27 | .0000 | .0000 | AIR | | | 25.0 |

While several embodiments and variations of the present invention for a 1× optical relay lens system for projection displays are described in detail herein, it should be apparent that the disclosure and teachings of the present invention will suggest many alternative designs to those skilled in the art.

Having thus described the invention, what is claimed as new and desired to be secured by Letters Patent is:

1. Apparatus for projecting onto a screen a first image at a first wavelength, a second image at a second wavelength, and a third image at a third wavelength, comprising:

means, including a 1× relay lens, a color splitting prism assembly positioned on a first side of said 1× relay lens, and a polarizing prism assembly positioned on a second side of said 1× relay lens, for combining said first image, said second image and said third image to form a substantially superposed relayed image; and means for projecting an image of said substantially superposed relayed image onto a screen.

2. Apparatus as claimed in claim 1, wherein the polarizing prism assembly comprises a glass polarizing beam splitting cube.

3. Apparatus as claimed in claim 2, wherein the glass for the color splitting prism assembly and the glass for the polarizing prism assembly are equally split and located on the object and image sides of the 1× relay lens to provide a large working distance in glass without resulting in residual lateral color.

4. Apparatus as claimed in claim 1, wherein said color splitting prism assembly comprises a crossed dichroic beam splitter cube, and said polarizing prism assembly comprises a polarizing beam splitter cube.

5. Apparatus as claimed in claim 4, wherein the sizes of said beam splitter cube and said polarizing beam splitter cube are substantially equal, resulting in a 1× symmetrical lens, such that the assembly is free from coma, distortion of lateral color, and is corrected for any remaining aberrations.

\* \* \* \* \*